(12) United States Patent
Ohkubo et al.

(10) Patent No.: US 7,151,642 B2
(45) Date of Patent: Dec. 19, 2006

(54) INFORMATION PLAYBACK METHOD AND APPARATUS

(75) Inventors: Shuichi Ohkubo, Tokyo (JP);
Masatsugu Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 113 days.

(21) Appl. No.: 10/974,567

(22) Filed: Oct. 27, 2004

(65) Prior Publication Data
US 2005/0094304 A1    May 5, 2005

(30) Foreign Application Priority Data
Oct. 30, 2003   (JP)   ............... 2003-369856
Apr. 12, 2004   (JP)   ............... 2004-116365

(51) Int. Cl.
*G11B 5/035*   (2006.01)
*G11B 5/09*    (2006.01)
*H03H 7/30*    (2006.01)

(52) U.S. Cl. ............. 360/65; 360/46; 375/232

(58) Field of Classification Search ............ 360/65, 360/46; 375/232
See application file for complete search history.

(56) References Cited

U.S. PATENT DOCUMENTS

| 5,841,601 | A | 11/1998 | Fisher | |
| 6,992,964 | B1 * | 1/2006 | Takehara et al. | 369/59.22 |
| 2001/0048717 | A1 * | 12/2001 | Ougi et al. | 375/231 |
| 2003/0174621 | A1 | 9/2003 | Takehara et al. | |
| 2005/0193318 | A1 * | 9/2005 | Okumura et al. | 714/795 |

FOREIGN PATENT DOCUMENTS

| EP | 0 801 484 A2 | 10/1997 |
| JP | 2000-123487 | 4/2000 |
| JP | 2001-189053 | 7/2001 |
| JP | 2003-303417 | 10/2003 |

OTHER PUBLICATIONS

Nair S.K. et al., "Data Storage Channel Equalization Using Neural Networks", *IEEE Transactions on Neural Networks*, 8(5):1037-1048 (1997), XP-000699317.
Nair S.K., "Nonlinear Equalization for Digital Recording Channels", *Internet document*, 1-149 (1995), XP-002318614.
Proakis J.J., "Digital Communications", *McGraw-Hill*, 611-612 (1995), XP-002319362.

(Continued)

*Primary Examiner*—Wayne Young
*Assistant Examiner*—Jason Olson
(74) *Attorney, Agent, or Firm*—Scully, Scott, Murphy & Presser, P.C.

(57) ABSTRACT

An information playback apparatus includes a first FIR filter, ideal signal generator, weighted equalization error calculator, and coefficient calculator. The first FIR filter generates an equalized waveform by equalizing, to a partial response waveform, a playback data string obtained by playing back a recorded signal recorded on an information recording medium. The ideal signal generator generates a target waveform serving as an equalization target. The weighted equalization error calculator calculates a data string by performing convolution computation for an equalization error which is a difference between the equalized waveform and the target waveform, on the basis of one of the playback data string and the equalized waveform input from the first FIR filter and the target waveform input from the ideal signal generator. The coefficient calculator calculates a tap coefficient for the first FIR filter on the basis of the data string input from the weighted equalization error calculator, and outputs the tap coefficient to the first FIR filter. An information playback method is also disclosed.

21 Claims, 10 Drawing Sheets

OTHER PUBLICATIONS

Shahid Qureshi, "Adaptive Equalization", Sep. 1985, XP00608510, IEEE.

R. D. Cideciyan et al., "A PRML System for Digital Magnetic Recording", Jan. 1992, XP000457625, IEEE.

* cited by examiner

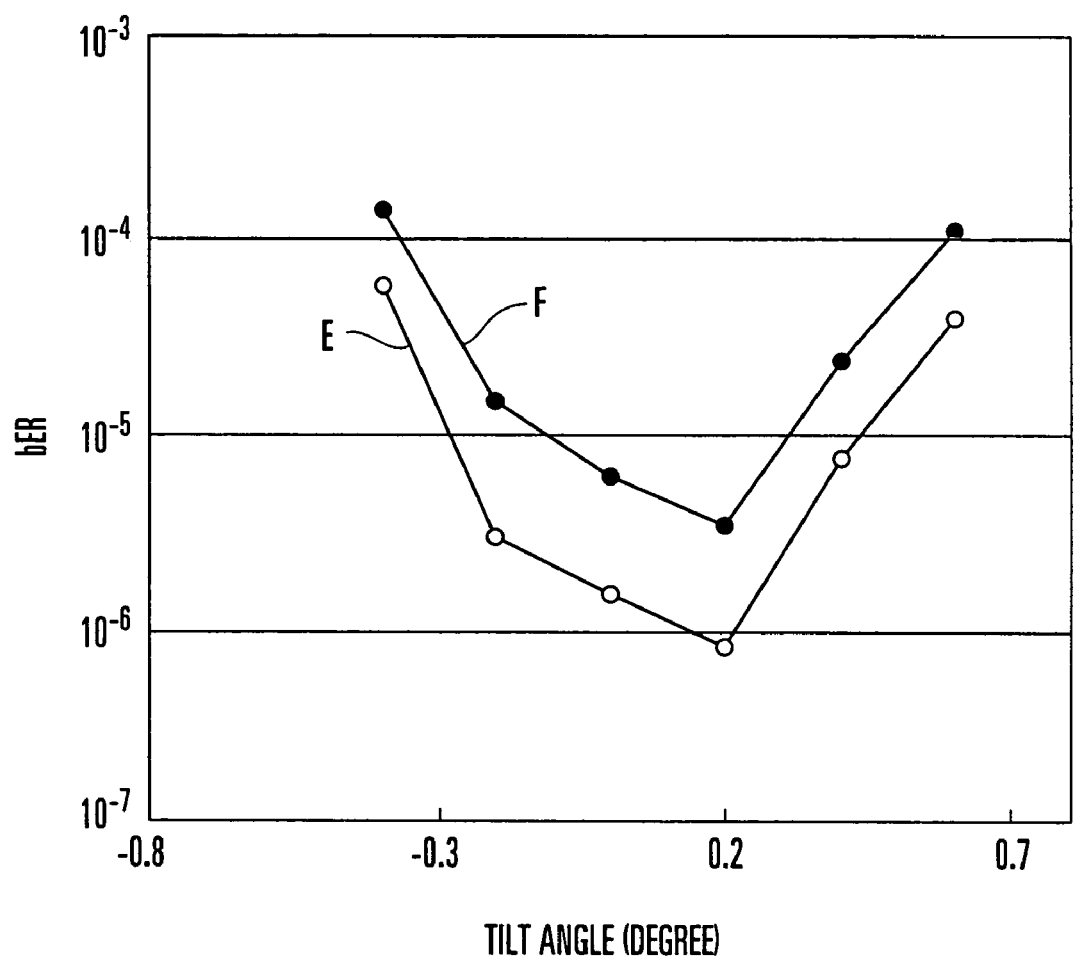
F I G. 12

INFORMATION PLAYBACK METHOD AND APPARATUS

BACKGROUND OF THE INVENTION

The present invention relates to an information playback method and apparatus which play back a signal recorded on an information recording medium and, more particularly, to an information playback method and apparatus which play back a recorded signal by using partial response equalization and Viterbi decoding.

As a technique of increasing the recording density by signal processing, the PRML (Partial Response Maximum Likelihood) technique including Viterbi decoding processing is generally known. According to the PRML scheme, a playback signal is equalized to a PR (Partial Response) waveform having intentionally given symbol interference, and data is discriminated by a Viterbi detector using the multilevel transition caused by intersymbol interference.

FIG. 13 shows the playback circuit unit of a conventional information playback apparatus which discriminates data by the PRML scheme. After an analog playback signal obtained from an information recording medium 110 is input to a low-pass filter 111, the output from the low-pass filter 111 is digitized by an AD converter 112. The output from the AD converter 112 is input to a PLL (Phased Locked Loop) circuit 113 to obtain a time-series playback data string $Y_d$ (d is an integer of one or more) sampled at a clock period. The time-series playback data string $Y_d$ is input to an FIR (Finite Impulse Response) filter 114 to be equalized to a predetermined partial response waveform $H_t$ (t is an integer satisfying $1 \leq t < d$) by convolution computation with a tap coefficient $W_s$ (s is an integer satisfying $1 \leq s < d$) of the FIR filter 114. The playback data after partial response equalization is input to a Viterbi detector 118, which in turn outputs identification data $A_d$. The identification data $A_d$ is input to an FIR filter 115 to calculate an ideal signal (target waveform) by convolution computation with the partial response waveform $H_t$. This ideal signal is input to a coefficient calculator 119. The equalized playback data is also input from the FIR filter 114 to the coefficient calculator 119.

Techniques for partial response equalization include several techniques such as a zero force method and MMSE (Minimum Mean Square Error) method. In general, the MMSE method is often used. As disclosed in Japanese Patent Laid-Open No. 2000-123487 (reference 1), the MMSE method is a technique of determining a tap coefficient $W_s$ so as to minimize the mean square value of d of an equalization error $v_d$ defined by $$v_d = \sum_s Y_{d-s} \times W_s - \sum_t A_{d-t} \times H_t \quad (1)$$

More specifically, therefore, the tap coefficient $W_s$ is determined to minimize $\epsilon'$ expressed by $$\varepsilon' = E\left[\left(\sum_s Y_{d-s} \times W_s - \sum_t A_{d-t} \times H_t\right)^2\right] = E[v_d^2] \quad (2)$$

where E[ ] represents the operation of obtaining the mean value of d in the expression in [ ], and the expression in [ ] represents the square of the equalization error $v_d$ defined by equation (1), i.e., the square of the difference between the equalized playback data and the ideal signal. Referring to FIG. 13, the coefficient calculator 119 receives the equalized playback data string from the FIR filter 114 and the data string of the ideal signal from the FIR filter 115, and determines the tap coefficient $W_s$ for the FIR filter 114 so as to minimize the mean square value of d of the equalization error $v_d$, i.e., $\epsilon'$.

More specifically, techniques of obtaining a condition for minimizing $\epsilon'$ or a quasi-condition for the minimization include, for example, a technique of obtaining a condition (equation) for nullifying the deviation of the tap coefficient $W_s$ by matrix calculation, and a technique of repeatedly updating and obtaining the tap coefficient $W_s$ starting from a proper initial value of the tap coefficient $W_s$. The latter technique is disclosed in Japanese Patent Laid-Open No. 2001-189053 (reference 2) and the like.

As disclosed in Japanese Patent Laid-Open No. 2003-303417 (reference 3) and the like, a technique of calculating the partial response waveform $H_t$ by using the least squares method based on a playback waveform from a disk is known.

The present inventors, however, have found that equalization based on the MMSE method does not necessarily minimize the data detection error (bit error rate: to be referred to as "bER" hereinafter).

This is because the decoding performance of the Viterbi detector 118 varies depending on whether the noise characteristic of a signal input to the Viterbi detector 118 is chromatic or white. A general definition about whether noise is white or chromatic will be described below by using the above equalization error $v_d$. Assume that with respect to the noise component (equalization error) $v_d$, an autocorrelation $R_f$ defined by $R_f = E[v_d \times v_{d+f}]$ takes a non-zero finite value only for $R_0$, and takes 0 for all values other than $R_0$. In this case, this noise is white. If there are noise components which take non-zero finite values for values other than $R_0$, e.g., $R_1$ and $R_2$, the noise is chromatic. If the noise characteristic of data input to the Viterbi detector 118 is white, the Viterbi detector 118 can exhibit optimal detection performance. In general, however, since the noise characteristic of a playback signal obtained from the information recording medium 110 is chromatic, the bER cannot be generally minimized by equalization based on the MMSE method.

SUMMARY OF THE INVENTION

The present invention has been made in consideration of the above problems, and has as its object to determine a tap coefficient under the condition that the detection performance is optimized, i.e., the bER is minimized, regardless of the noise characteristic of a signal input to a Viterbi detector.

In order to achieve the above object, according to the present invention, there is provided an information playback apparatus comprising a first FIR filter which generates an equalized waveform by equalizing, to a partial response waveform, a playback data string obtained by playing back a signal recorded on an information recording medium, target waveform generating means for generating a target waveform serving as an equalization target, weighted equalization error calculation means for calculating a data string by performing convolution computation for an equalization error which is a difference between the equalized waveform and the target waveform, on the basis of one of the playback data string and the equalized waveform input from the first FIR filter and the target waveform input from the target waveform generating means, and coefficient calculation means for calculating a tap coefficient for the first FIR filter on the basis of the data string input from the weighted equalization error calculation means, and outputting the tap coefficient to the first FIR filter.

In addition, according to the present invention, there is provided an information playback method comprising the steps of generating a playback data string by playing back a signal recorded on an information recording medium, generating an equalized waveform by equalizing the playback data string to a partial response waveform using an FIR filter, generating a target waveform serving as an equalization target, calculating a data string by performing convolution computation for an equalization error which is a difference between the equalized waveform and the target waveform, on the basis of the target waveform and one of the playback data string and the equalized waveform, and determining a tap coefficient for the first FIR filter on the basis of a data string obtained by performing convolution computation for the equalization error.

BRIEF DESCRIPTION OF THE DRAWINGS

FIG. 12 is a graph showing bER/tilt angle characteristics in the use of a playback-only optical disk.

DESCRIPTION OF THE PREFERRED EMBODIMENTS

The embodiments of the present invention will be described next with reference to the accompanying drawings.

Figure 1:
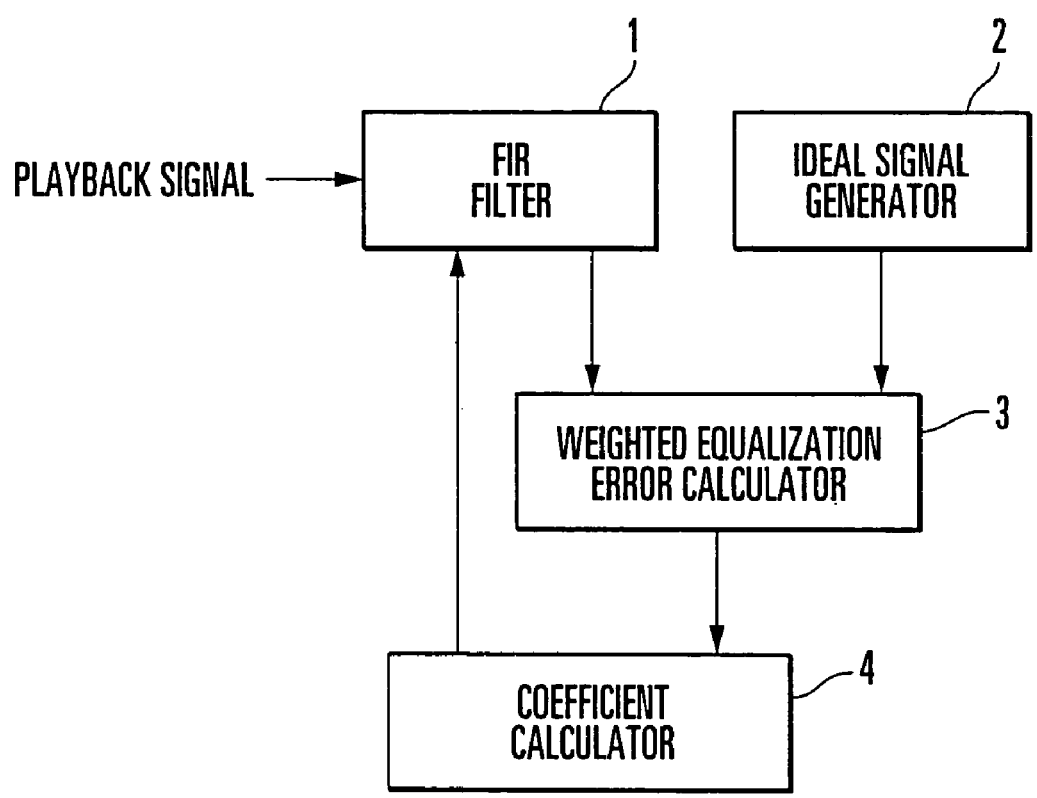
FIG. 1 is a block diagram showing the main part of the playback unit of an information playback apparatus according to the present invention.

FIG. 1 shows the main part of the playback unit of an information playback apparatus according to the present invention.

According to a conventional equalization method such as the MMSE method, an equalization error which is the difference between an equalized waveform and a target waveform as an equalization target is calculated and directly input to the coefficient calculator. The coefficient calculator then calculates a tap coefficient for the FIR filter so as to almost minimize the mean square of the input equalization error.

Figure 2:
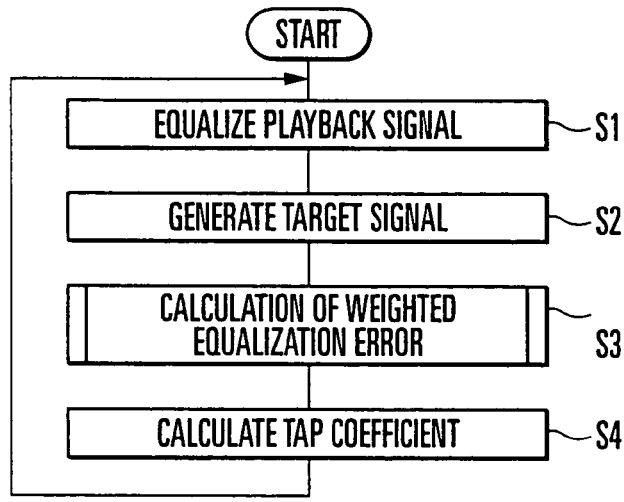
FIG. 2 is a flowchart showing the flow of processing in the playback unit shown in FIG. 1.

In contrast to this, in the present invention, an equalization error is subjected to predetermined convolution computation before it is input to a coefficient calculator 4. This will be described in detail with reference to FIGS. 1 and 2.

First of all, an FIR filter 1 equalizes a playback signal to a partial response waveform (step S1). An ideal signal generator 2 generates an ideal signal (target waveform) (step S2). The equalized playback signal (equalized waveform) and ideal signal are input to a weighted equalization error calculator 3, which in turn calculates a weighted equalization error by performing convolution computation for the equalization error which is the difference between the two signals (step S3). This weighted equalization error is input to the coefficient calculator 4, which in turn calculates a tap coefficient used in the FIR filter 1 (step S4). The weighted equalization error calculator 3 performs convolution computation to reflect the chromaticity of the equalization error in the determination of a tap coefficient.

Figure 3:
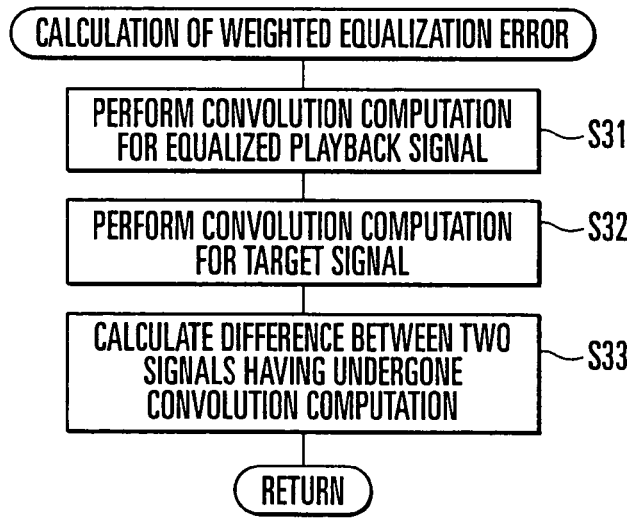
FIG. 3 is a flowchart showing an example of the flow of processing in weighted equalization error calculation.
Figure 4:
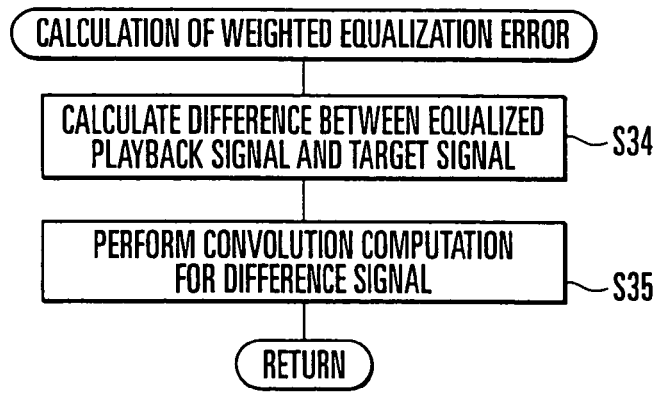
FIG. 4 is a flowchart showing another example of the flow of processing in weighted equalization error calculation.

Note that since convolution computation is linear computation, the computational sequence is not specifically limited. That is, as shown in FIG. 3, convolution computation may be performed first for the equalized playback signal and ideal signal each (steps S31 and S32), and then a weighted equalization error may be calculated from the difference between the two resultant signals (step S33). Alternatively, as shown in FIG. 4, an equalization error is calculated first from the difference between the equalized playback signal and the ideal signal (step S34), and then a weighted equalization error may be calculated by performing convolution computation for the equalization error (step S35). It suffices if the data string of an equalization error in which the chromaticity is reflected is input to the coefficient calculator 4 in the end.

Note that "equalization" means conversion of an input signal into a predetermined waveform different from its original waveform.

A more detailed arrangement for the calculation of a weighted equalization error and its operation will be described in detail with reference to the accompanying drawings.

First Embodiment

Figure 5:
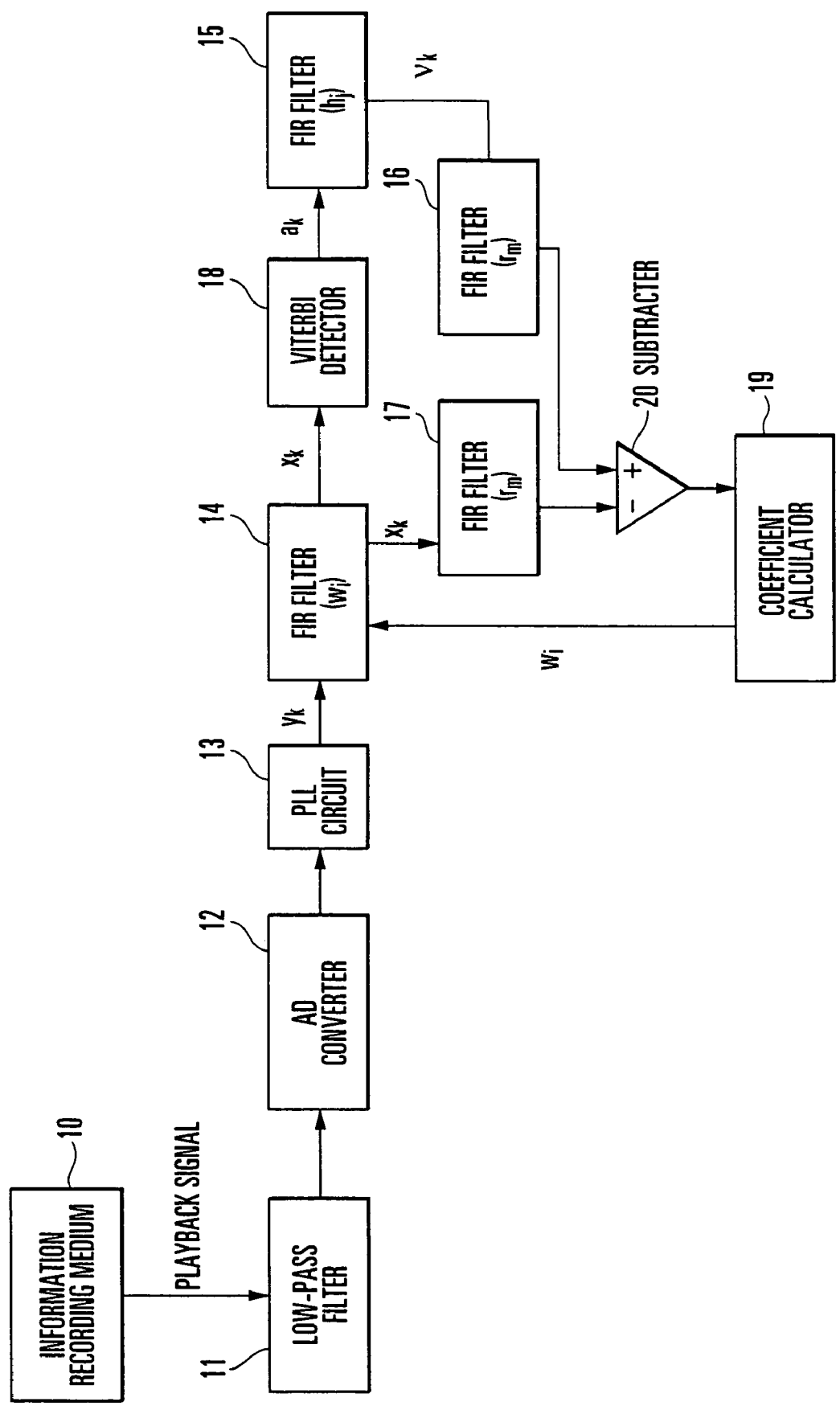
FIG. 5 is a block diagram showing the arrangement of an information playback apparatus according to the first embodiment of the present invention.

FIG. 5 shows an information playback apparatus according to the first embodiment of the present invention. As shown in FIG. 5, the playback apparatus according to this embodiment includes a low-pass filter 11, AD converter 12, PLL circuit 13, FIR filters 14, 15, 16, and 17, Viterbi detector 18, coefficient calculator 19, and subtracter 20. The weighted equalization error calculator 3 is comprised of the FIR filters 16 and 17 and subtracter 20.

Referring to FIG. 5, a playback analog signal read out from an information recording medium 10 such as an optical disk is input to the low-pass filter 11 having a function of suppressing noise, and is then digitized by the AD converter 12, thus taking a discretized (quantized) value. The digitized playback signal is input to the PLL circuit 13. The PLL circuit 13 extracts a clock signal from the input playback digital signal, and outputs time-series waveform data $y_k$ of the playback signal sampled at a clock period. In this case, k is an integer satisfying $1 \leq k \leq n$ where n is the number of samples obtained at a clock period, which is an integer of one or more.

Figure 6:
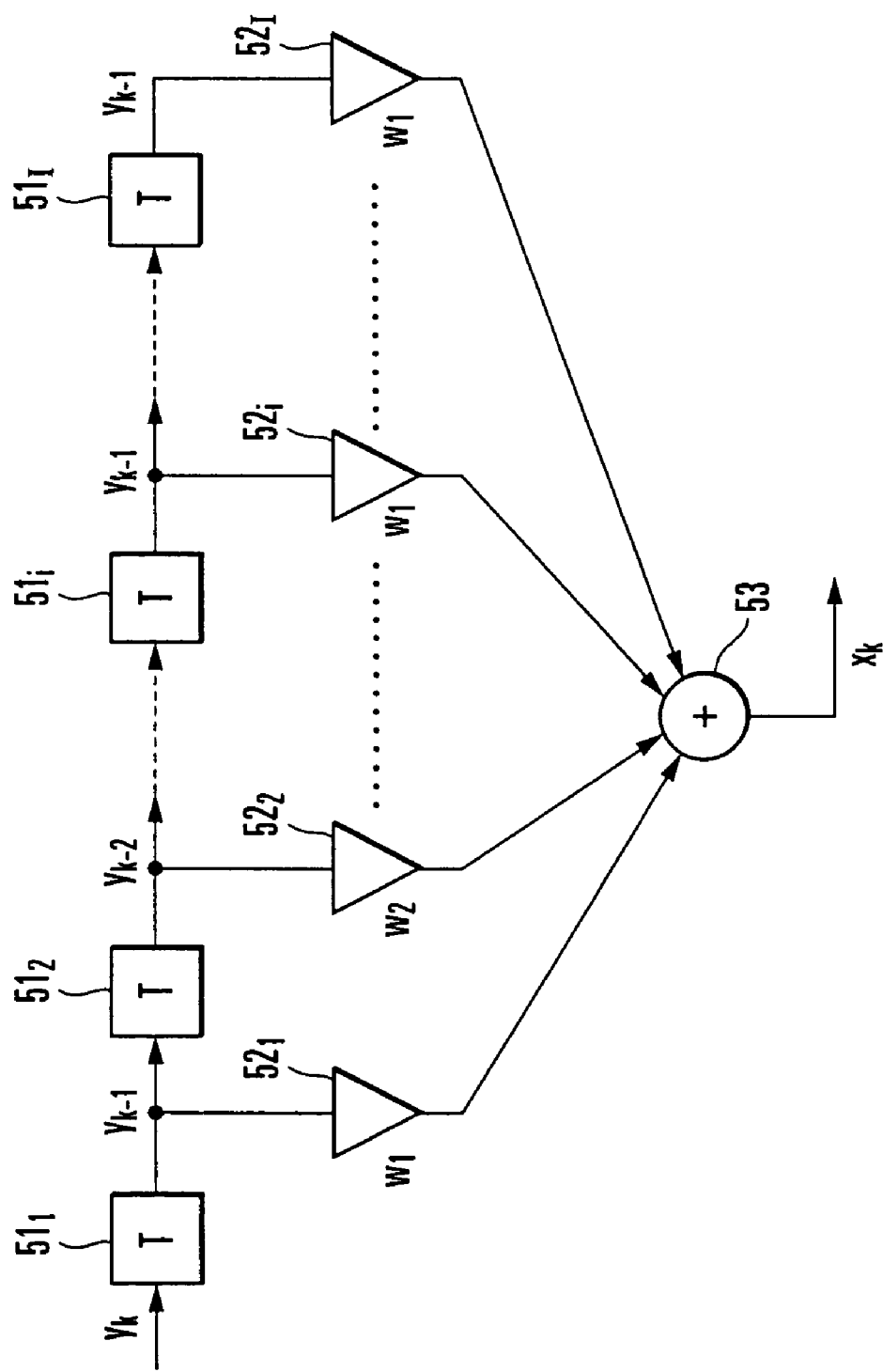
FIG. 6 is a block diagram showing the arrangement of an FIR filter in FIG. 5.

The time-series waveform data $y_k$ is input to the FIR filter 14. As shown in FIG. 6, the FIR filter 14 forms a transversal filter including I (I is an integer satisfying $1 \leq I < k$) cascaded delay elements $51_1, 51_2, \ldots, 51_i, \ldots, 51_I$ (i is an integer satisfying $1 \leq i \leq I$), I multipliers $52_1, 52_2, \ldots, 52_i, \ldots, 52_I$ respectively having tap coefficients $w_1, w_2, \ldots, w_i, \ldots, w_I$, and an adder 53. The delay elements $51_1$ to $51_I$ are formed from, for example, D flip-flops. Every time one pulse of a clock signal is input to the clock terminal of each element, the playback waveform data $y_k$ is delayed by 1 T for each element. In this case, T represents the period of a clock signal. Playback waveform data $y_{k-1}, y_{k-2}, \ldots, y_{k-i}, \ldots, y_{k-I}$ sequentially passing through the cascaded delay elements $51_1$ to $51_I$ pass through the multipliers $52_1$ to $52_I$ respectively connected to the delay elements $51_1$ to $51_I$ to be multiplied by the tap coefficients $w_1, w_2, \ldots, w_i, \ldots, w_I$. These data are then added by the adder 53. The resultant data is output as time-series data $x_k$.

$$x_k = \sum_i w_i \times y_{k-i} \quad (3)$$

The output $x_k$ from the FIR filter 14 is the computation result obtained by convolution computation for the time-series playback waveform data $y_k$ and the tap coefficient $w_i$ of the FIR filter 14.

The playback waveform data $y_k$ is equalized to a predetermined partial response waveform $h_j$ (j is an integer satisfying $1 \leq j \leq J$; J is the number of partial response waveform data and an integer satisfying $1 \leq J < k$) by convolution computation with the tap coefficient $w_i$ of the FIR filter 14. A tap count (=the number of multipliers) I of the FIR filter 14 is generally set to about 7 to 20. Referring to FIG. 6, one multiplier $52_i$ is provided for each delay element $51_i$. However, one multiplier may be provided for a plurality of delay elements depending on the frequency characteristics of the playback waveform data $y_k$.

As shown in FIG. 5, the time-series output waveform $x_k$ having undergone equalization by the FIR filter 14 is input to the Viterbi detector 18. The Viterbi detector 18 estimates the value of the recorded signal recorded on the information recording medium 10, and generates tentative time-series binary identification data $a_k$. The time-series identification data $a_k$ is input to the FIR filter 15. The FIR filter 15 forms a transversal filter like the FIR filter 14, and performs convolution computation for the identification data $a_k$ and the partial response waveform $h_j$. Time-series output data $v_k$ from the FIR filter 15 is given by $$v_k = \sum_j a_{k-j} \times h_j \quad (4)$$

The output signals from the FIR filters 14 and 15 are respectively input to the FIR filters 17 and 16 to be subjected to convolution computation. The resultant data are input to the subtracter 20. The equalization error calculated by the subtracter 20 is then input to the coefficient calculator 19.

According to the conventional equalization technique, in the absence of the FIR filters 16 and 17, the outputs from the FIR filters 114 and 115 are input to the coefficient calculator 119, which in turn determines the tap coefficient $W_s$ for the FIR filter 114 so as to minimize $\epsilon'$ of equation (2). The waveform equalized by the finally determined tap coefficient $W_s$ is input to the Viterbi detector 118, and the final time-series identification data $A_d$ is output.

Figure 13:
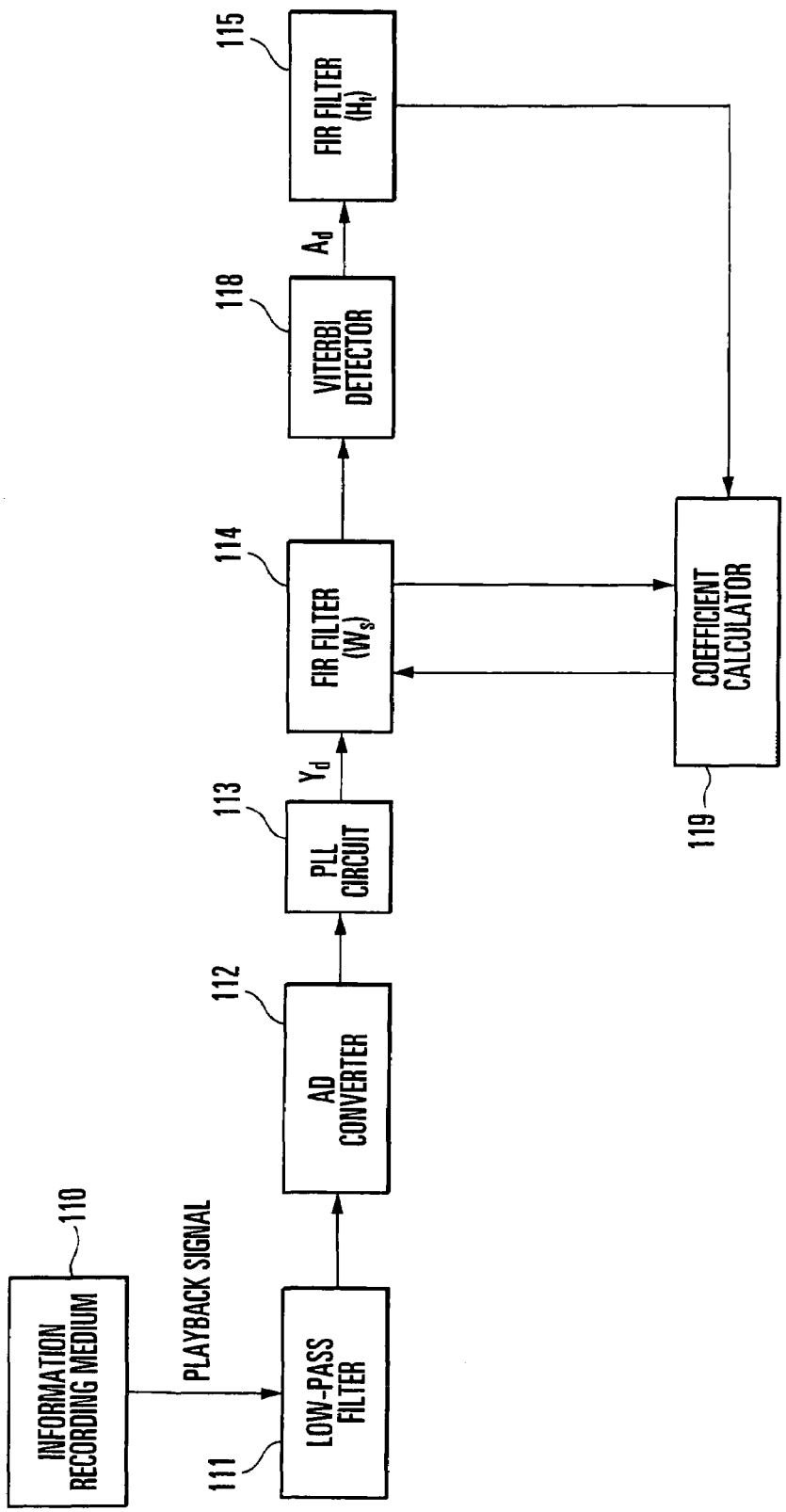
FIG. 13 is a block diagram showing the arrangement of the playback unit of a conventional information playback apparatus.

Referring to FIG. 13, the detection performance of the Viterbi detector 118 can be calculated by the ratio between the minimum value of a Euclidean distance $d_E$ between the ideal signal of the correct identification data $A_d$ and the ideal signal of the erroneous identification data $A_d$ and the minimum value of mean square $\epsilon'=E[(\Sigma Y_{d-s} \times W_S - \Sigma A_{d-t} \times H_t)^2]$. In this case, an ideal signal is defined as the result of convolution computation for the identification data $A_d$ and a partial response waveform $H_t$. If, for example, a partial response waveform is represented by (1, 2, 2, 1) and the correct identification data $A_d$ detected by the Viterbi detector 118 is represented by [0001111], the corresponding ideal signal is represented by [0001356]. In this case, considering the erroneous identification data $A_d$ as [0000111], since the ideal signal is [0000135], the Euclidean distance $d_E$ between the two ideal signals is given by $d_E^2=(1-0)^2+(3-1)^2+(5-3)^2+(6-5)^2=10$. As the Euclidean distance $d_E$ increases, the probability that the identification data $A_d$ is erroneously detected as the erroneous identification data $A_d$ decreases. As the minimum value of the Euclidean distance between the ideal signal of the correct identification data $A_d$ and the ideal signal of the erroneous identification data $A_d$ increases, the probability that the identification data $A_d$ is erroneously detected decreases. Note that the Euclidean distance $d_E$ is the amount determined by the partial response waveform $H_t$ and correct identification data (=recorded data) $A_d$. If the correct identification data $A_d$ is [0001111], the erroneous identification data $A_d$ which provides the minimum Euclidean distance $d_E$ is [0000111], and the square of the minimum Euclidean distance $d_E$ is 10.

In the general MMS method, the tap coefficient $W_s$ is determined under that condition that $\epsilon'=E[V_d^2]$ given by equation (2) is minimized. Assume that a noise characteristic is white, i.e., that when an autocorrelation $R_f$ is defined as $R_f=E[V_d \times v_{d+f}]$, all values $R_f$ other than $R_0=\epsilon'=E[v_d^2]$ are 0. In this case, optimal detection performance can be obtained with the tap coefficient $W_s$ determined by the general MMSE method. However, the noise characteristic of a playback signal obtained from the information recording medium 10 is generally chromatic, and values $R_f$ other than $R_0$ do not become 0. In this case, the mean square of an equalization error must be calculated in consideration of the contribution of $R_f$ other than $R_0$ as well. The FIR filters 16 and 17 in FIG. 5 are added for the consideration of the contribution of $R_f$ other than $R_0$. Tap coefficients $r_m$ (m is an integer satisfying $1 \leq m \leq M$; M is a tap count and an integer satisfying $1 \leq M < k$) are determined depending on a partial response waveform.

A reference for setting the tap coefficient $r_m$ for each of the FIR filters 16 and 17 will be described in detail in correspondence with an actual partial response waveform.

Letting $h_j$ be a partial response waveform and $e_L$ ($e_L$ is one of values of $-1$, 0, and 1) be an error data string, it suffices to obtain $r_m$ and $e_L$ which minimize A defined by $A=\Sigma r_m^2$ ($\Sigma$ represents the sum of m) and $r_m=\Sigma h_{m-L} \times e_L$ ($\Sigma$ represents the sum of L). Reducing A increases the effect of suppressing the occurrence of erroneous detection between the identification data $a_k$ with the small Euclidean distance $d_E$. In Viterbi detection, erroneous detection tends to occur between identification data $a_k$ with the small Euclidean distance $d_E$. Assume that the partial response waveform $h_j$ is represented by PR (1, 2, 2, 1), i.e., $h_1=1, h_2=2, h_3=2, h_4=1$, and $h_j=0$ (J is an integer of five or more). In this case, if $e_1=1$ and other values $e_L$ are 0, A=10 becomes the minimum value when $r_1=1$, $r_2=2$, $r_3=2$, $r_4=1$, and $r_M=0$ (M is an integer of five or more). Assume that the partial response waveform $h_j$ is represented by PR (1, 2, 2, 2, 1), i.e., $h_1=1$, $h_2=2$, $h_3=2$, $h_4=2$, $h_5=1$, and $h_j=0$ (J is an integer of six or more). In this case, if $e_1=1$, $e_2=0$, $e_3=-1$, $e_4=0$, and $e_5=1$ and other values $e_L$ are 0 [can also be expressed as $e_L$ (1, 0, -1, 0, 1)], A=12 becomes the minimum value when $r_1=1$, $r_2=2$, $r_3=1$, $r_4=0$, $r_5=0$, $r_6=0$, $r_7=1$, $r_8=2$, $r_9=1$, and $r_M=0$ (M is an integer of 10 or more) [can also be expressed as $r_m=(1, 2, 1, 0, 0, 0, 1, 2, 1)$]. Note that in the case of PR (1, 2, 2, 2, 1), when $e_L=(1, 0, -1)$ or $e_L=(1, 0, -1, 0, 1, 0, -1)$, A=12. It was, however, experimentally confirmed that the bER can be improved most effectively by minimizing the mean square of an equalization error with respect to $e_L=(1, 0, -1, 0, 1)$ [$r_m=(1, 2, 1, 0, 0, 0, 1, 2, 1)$] in consideration of chromaticity. However, by applying this embodiment to $e_L=(1, 0, -1)$ [$r_m=(1, 2, 1, 0, -1, -2, -1)$] or $e_L=(1, 0, -1, 0, 1, 0, -1)$ [$r_m=(1, 2, 1, 0, 0, 0, 0, 0, -1, -2, -1)$], the bER is improved as compared with the conventional technique of minimizing equation (2) without any consideration of chromaticity. Even if, therefore, these values are set as $r_m$, a bER improving effect can be obtained. In addition, all value $r_m$ other than these values which can improve the bER can be used. However, setting $r_m=(1, 2, 1, 0, 0, 0, 1, 2, 1)$ provides the best bER improving effect.

In summary of the above, in this embodiment, as shown in FIG. 5, it suffices to obtain the tap coefficient $w_i$ for the FIR filter 14 under the condition that $\epsilon$ given by the following equation is minimized or a quasi-condition for the minimization, in addition to the FIR filters 16 and 17.

$$\varepsilon = E\left[\left(\sum_i w_i \times z_{k-i} - u_k\right)^2\right] \quad (5)$$

where E[ ] represents the mean of k in the expression in [ ].

$$z_k = \sum_m r_m \times y_{k-m} \quad (6)$$

$$u_k = \sum_m r_m \times v_{k-m} \quad (7)$$

$$v_k = \sum_j a_{k-j} \times h_j \quad (8)$$

In this case, if the partial response waveform $h_j$ is determined, $r_m$ can be obtained in the above manner. If a plurality of $r_m$ candidates exist as in the case of PR (1, 2, 2, 2, 1), the minimum value of $\epsilon$ is calculated for each $r_m$, and $r_m$ which provides the smallest minimum value may be selected as $r_m$ which should be obtained. The value $v_k$ given by equation (8) is the result of convolution computation for the final identification data (=recorded data) $a_k$ and the partial response waveform $h_j$, i.e., the output from the FIR filter 15. The value $u_k$ given by equation (7) is the result of convolution computation for the output $v_k$ from the FIR filter 15 and the tap coefficient $r_m$ of the FIR filter 16.

$\Sigma w_i \times z_{k-i}$ in equation (5) can be rewritten into $\Sigma r_m \times x_{k-m}$ ($\Sigma$ is the sum of m) if $x_k = \Sigma w_i \times y_{k-i}$ ($\Sigma$ is the sum of i). Note that $x_k$ is the result of convolution computation for the tap coefficient $w_i$ of the FIR filter 14 and the playback waveform data $y_k$, i.e., the output from the FIR filter 14. Therefore, $\Sigma r_m \times x_{k-m}$, i.e., $\Sigma w_i \times z_{k-i}$, is the result of convolution computation for the tap coefficient $r_m$ of the FIR filter 17 and the output $x_k$ from the FIR filter 14, i.e., the output from the FIR filter 17. Therefore, referring to FIG. 5, minimizing $\epsilon$ of equation (5) indicates that the coefficient calculator 19 receives outputs from the FIR filters 16 and 17 and calculates the tap coefficient $w_i$ for the FIR filter 14 so as to minimize the mean square value of an equalization error, which is the difference between the outputs, in consideration of chromaticity.

The coefficient calculator 19 which calculates the tap coefficient $w_i$ may have a function of solving simultaneous equations with multiple variables of $\delta\epsilon=0$ obtained by calculating the deviation $\delta\epsilon$ with respect to $w_i$ in $\epsilon$ of equation (5) or a function of adaptively performing iterative convergence calculation starting from the proper initial value of the tap coefficient $w_i$. When simultaneous equations with multiple variables are to solved as in the former case, the playback waveform data $y_k$ may be directly input to the FIR filter 17 without being through the FIR filter 14 in FIG. 15. Although the technique of calculating the tap coefficient $w_i$ by convergence calculation as in the latter case does not coincide with the condition that $\epsilon$ is minimized and may just satisfy a quasi-condition for the minimization, the circuit arrangement can be made more simply.

In this embodiment, equalization is performed under the condition that the mean square of an equalization error is minimized, so as to reduce the error between data strings with the small Euclidean distance $d_E$ between ideal signals in consideration of the chromaticity of the equalization error. Combinations of specific data patterns which reduce the Euclidean distance $d_E$ between ideal signals may be set in advance, and the tap coefficient $w_i$ may be determined by this embodiment only when one of the data patterns is detected. With respect to other data patterns, $w_i$ may be determined by the conventional technique. This technique, however, additionally requires a table for the registration of these data patterns and a circuit for discriminating the data patterns. Therefore, determining $w_i$ without selecting such a data pattern is more convenient.

Second Embodiment

Figure 7:
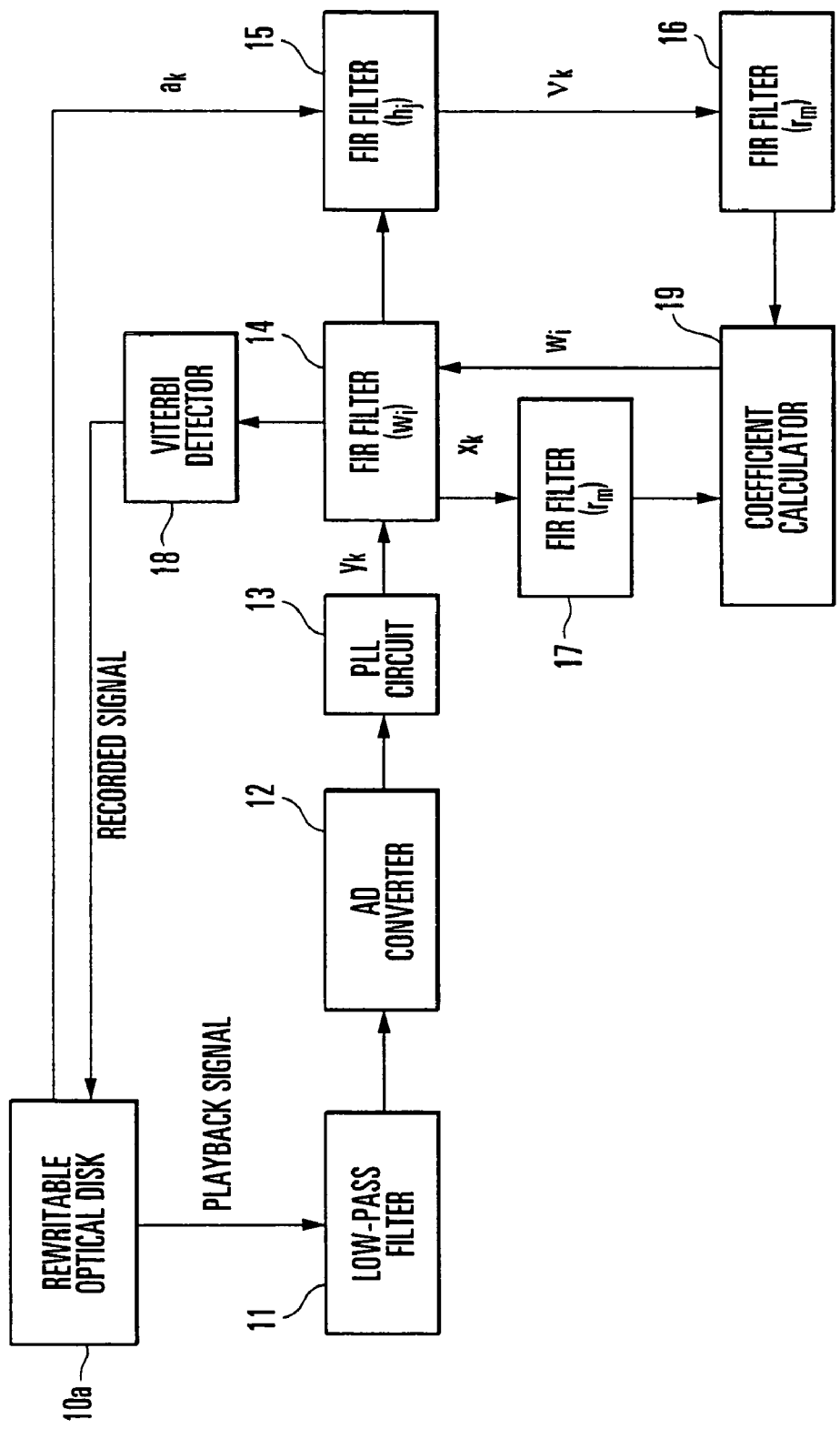
FIG. 7 is a block diagram showing the arrangement of an information playback apparatus according to the second embodiment of the present invention.

FIG. 7 shows the playback unit of a recording/playback apparatus for a rewritable optical disk. The same reference numerals as in FIG. 5 denote the same constituent elements in FIG. 7, and a repetitive description will be avoided as appropriate.

In the recording/playback apparatus for a rewritable optical disk, known data $a_k$ is recorded on a disk 10a to allow adjustment of a tap coefficient $w_i$. In this case, since the recorded data $a_k$ is known in advance, an output from a Viterbi detector 18 need not be input to an FIR filter 15. That is, it suffices to input the known recorded data $a_k$ to the FIR filter 15. The Viterbi detector 18 only outputs the recorded signal. In this embodiment, since the final identification data $a_k$ in the first embodiment is input to the FIR filter 15 from the beginning, the tap coefficient $w_i$ can be determined faster.

Third Embodiment

Figure 8:
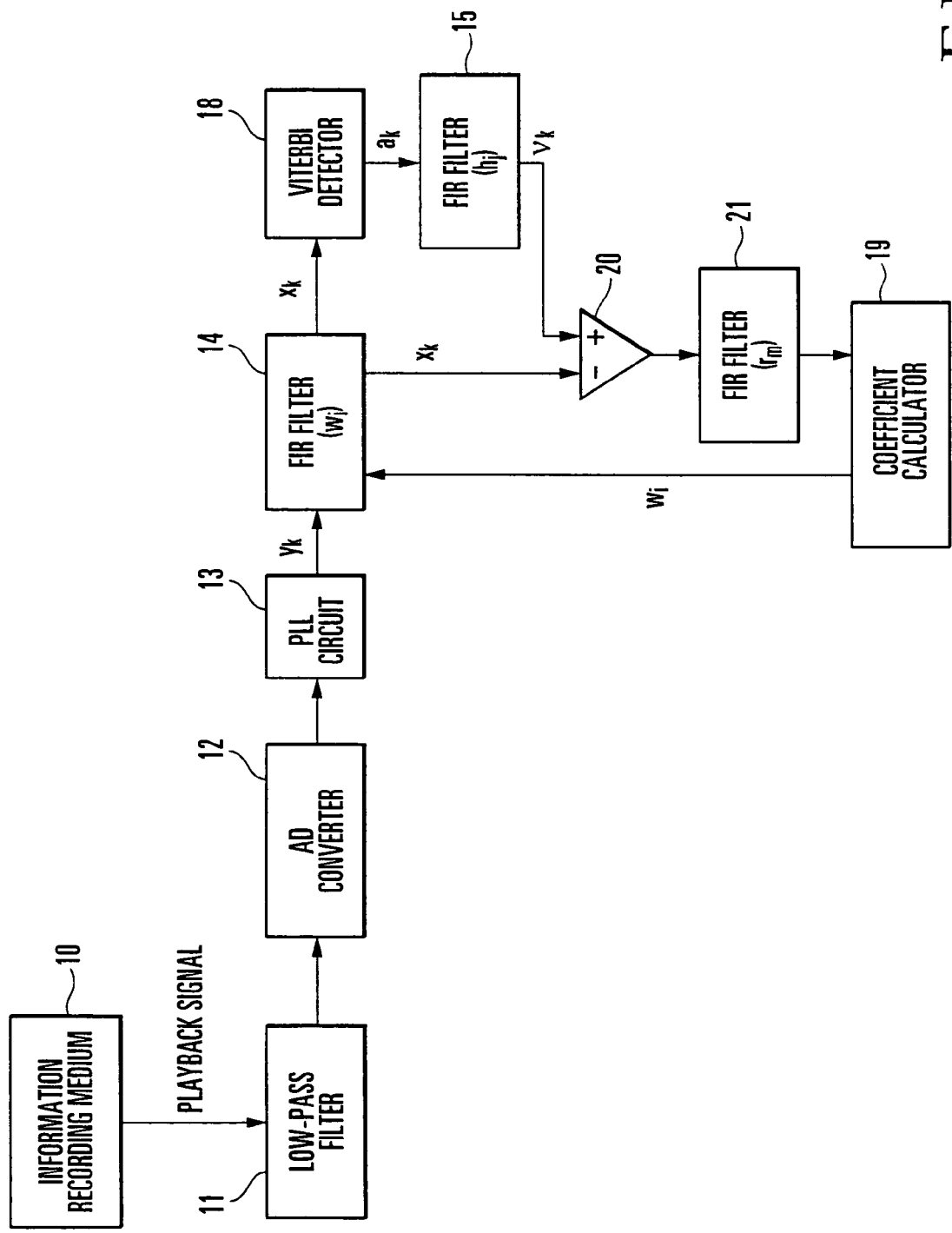
FIG. 8 is a block diagram showing the arrangement of an information playback apparatus according to the third embodiment of the present invention.

FIG. 8 shows an information playback apparatus according to the third embodiment of the present invention. The same reference numerals as in FIG. 5 denote the same constituent elements in FIG. 8, and a repetitive description will be avoided as appropriate.

A function similar to that of the playback apparatus according to the first embodiment shown in FIG. 5 is realized by the playback apparatus according to the third embodiment shown in FIG. 8. This embodiment is configured to make a subtracter 20 calculate an equalization error which is the difference between an output signal (target waveform) from an FIR filter 15 and a playback data string or the output data string obtained by inputting the playback data string to an FIR filter 14 and input the equalization error to an FIR filter 21 having a tap coefficient $r_m$ instead of inputting the playback data string and the output signal (target waveform) from the FIR filter 15 to the FIR filters 16 and 17 and inputting the outputs from the FIR filters to the subtracter 20. A tap coefficient $w_i$ for the FIR filter 14 is then obtained under the condition that $\epsilon$ given by equations (5) to (8) is minimized or quasi-condition for the minimization.

Note that in this embodiment, an equalization error calculator 3 is comprised of the subtracter 20 and FIR filter 21.

In this embodiment, the tap coefficient $w_i$ may be adjusted by using known recorded data $a_k$ as in the second embodiment.

Fourth Embodiment

Figure 9:
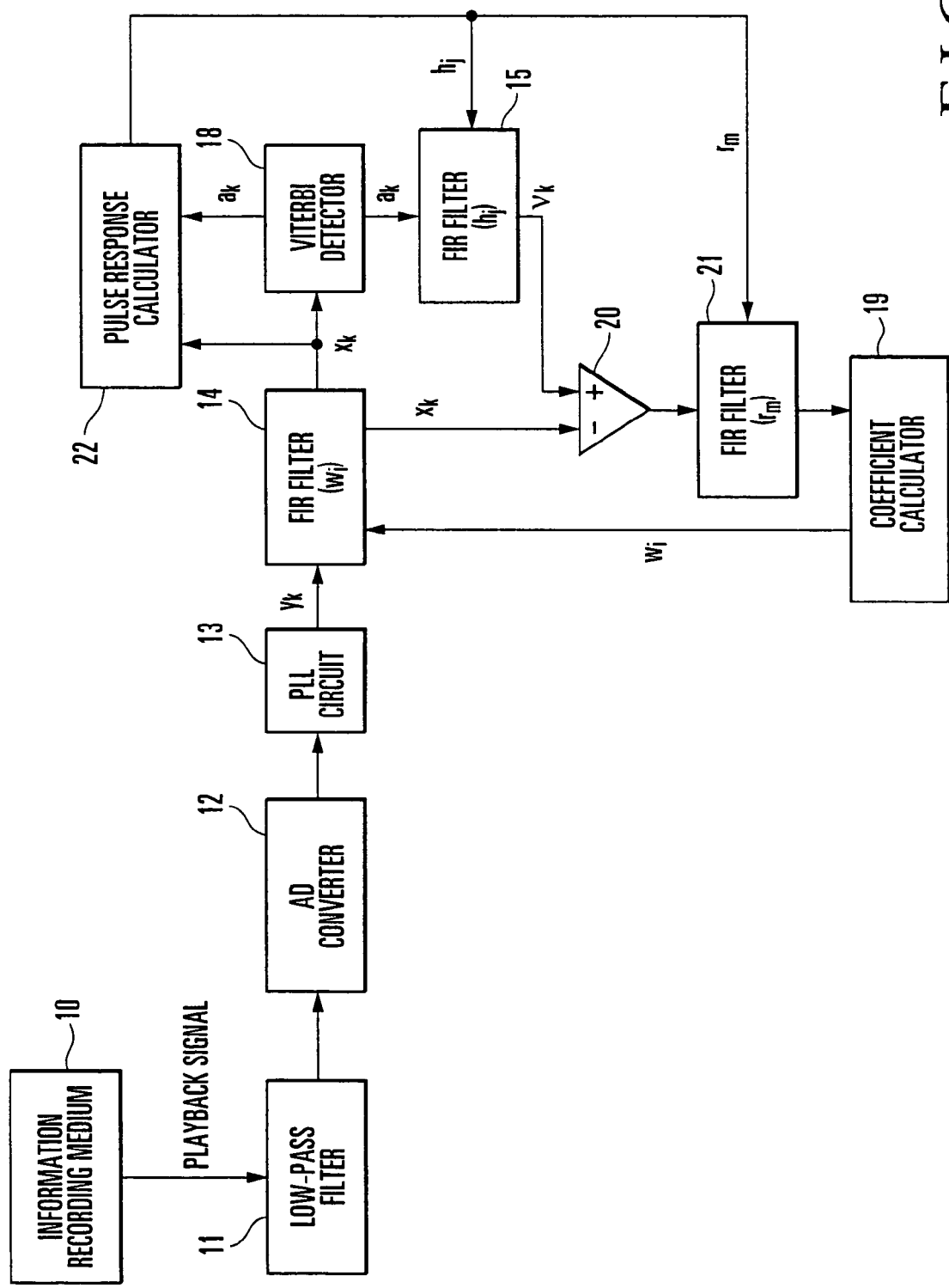
FIG. 9 is a block diagram showing the arrangement of an information playback apparatus according to the fourth embodiment of the present invention.

FIG. 9 shows an information playback apparatus according to the fourth embodiment of the present invention. The same reference numerals as in FIGS. 5 and 8 denote the same constituent elements in FIG. 9, and a repetitive description will be avoided as appropriate.

In the first to third embodiments, a predetermined data string is used as the data string $h_j$ defining a partial response waveform. However, $h_j$ can be determined from a playback waveform data string.

If, for example, the tangent tilt of a disk greatly deviates from the normal state, the playback waveform obtained from the disk exhibits large asymmetry. This is because the difference between the target partial response waveform and the actual playback waveform increases, and the waveform cannot be equalized to the target partial response waveform without increasing noise. In this case, the detection performance can be improved more by obtaining $h_j$ from the actual waveform than by using the predetermined $h_j$.

In this embodiment, therefore, as shown in FIG. 9, playback waveform data $x_k$ obtained by convolution computation and output from an FIR filter 14 and identification data $a_k$ output from a Viterbi detector 18 are input to a pulse response calculator (partial response waveform calculation means) 22, which in turn calculates a data string $h_j$ and tap coefficient $r_m$. The calculated data string $h_j$ and tap coefficient $r_m$ are respectively input FIR filters 15 and 21. In this case, the branch metric value of the Viterbi detector 18 must be changed in accordance with the obtained data $h_j$.

In addition, the pulse response calculator 22 may be provided for the information playback apparatus according to the first embodiment shown in FIG. 5, and the calculated data string $h_j$ and tap coefficient $r_m$ may be input to the FIR filter 15 and FIR filters 16 and 17.

Experiment 1

The effects of the above embodiments were checked by using a phase change optical disk as the information recording medium 10.

The data obtained by recording random data modulated on the basis of the (1–7) modulation scheme at a linear density of 130 nm/bit with a recording power as a parameter by using an optical head with a wavelength of 405 nm and numeral aperture NA=0.65 was played back by the information playback information shown in FIG. 5, and a bER was measured. More specifically, time-series playback data sampled at a clock period is equalized to PR (1, 2, 2, 2, 1) and identified (binarized) by the Viterbi detector 18, and a bER was measured by comparing the original data [the random data modulated on the basis of the (1–7) modulation scheme]. The tap count of the FIR filter 14 was set to 9, and the tap coefficient of each of the FIR filters 16 and 17 was set to $r_m$=(1, 2, 1, 0, 0, 0, 1, 2, 1).

Figure 10:
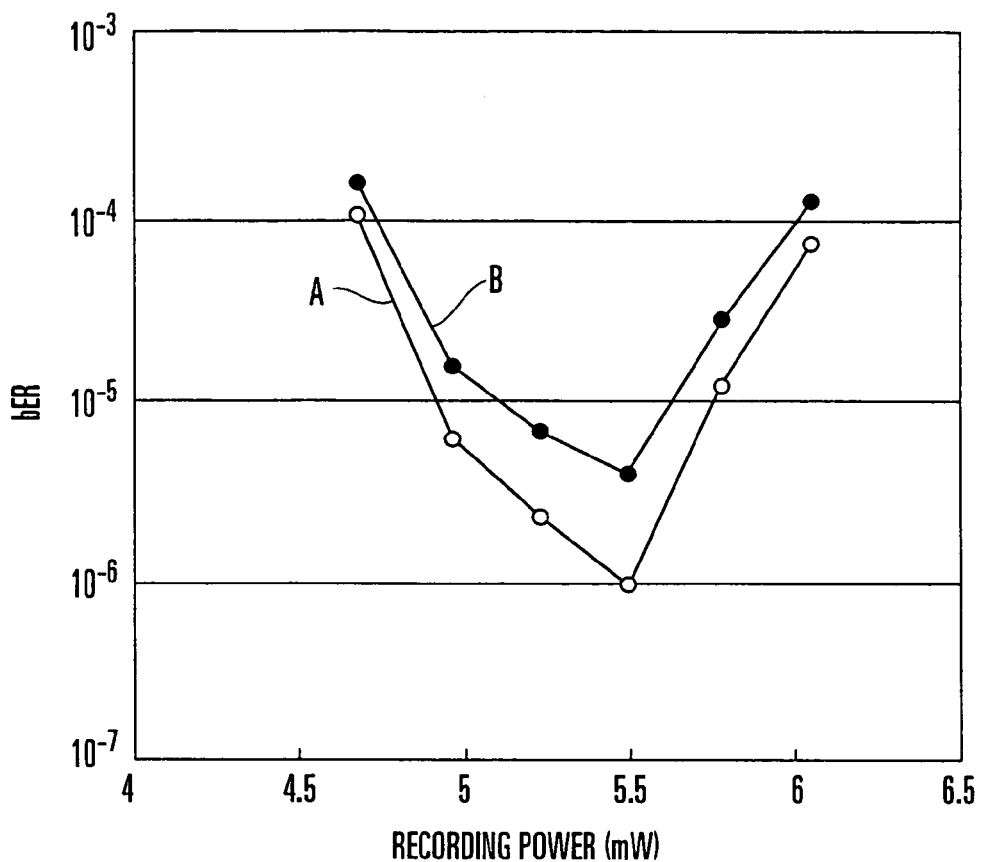
FIG. 10 is a graph showing bER/recording power characteristics in the first embodiment.

FIG. 10 shows the measurement result, on a bER as a function of recording power. FIG. 10 also shows the result obtained by measuring a bER upon playing back data by using the conventional information playback apparatus without the FIR filters 16 and 17. A curve A represents the bER measured by the arrangement according to the first embodiment, and a curve B represents the bER measured by the conventional arrangement. It is obvious that the bER is improved at any recording power by the first embodiment as compared with the prior art.

Experiment 2

Data identical to that in Experiment 1 was recorded on a phase change optical disk identical to that in Experiment 1 at the same linear density by using the information playback apparatus in FIG. 5 which had the same specifications as those in Experiment 1. After data was recorded at one recording power under optimal conditions, the tilt angle of the disk was changed, and a bER was measured in the arrangement of the first embodiment and in the conventional arrangement in the same manner as in Experiment 1. A partial response waveform and the arrangements of the FIR filters 14, 16, and 17 are the same as those in Experiment 1.

Figure 11:
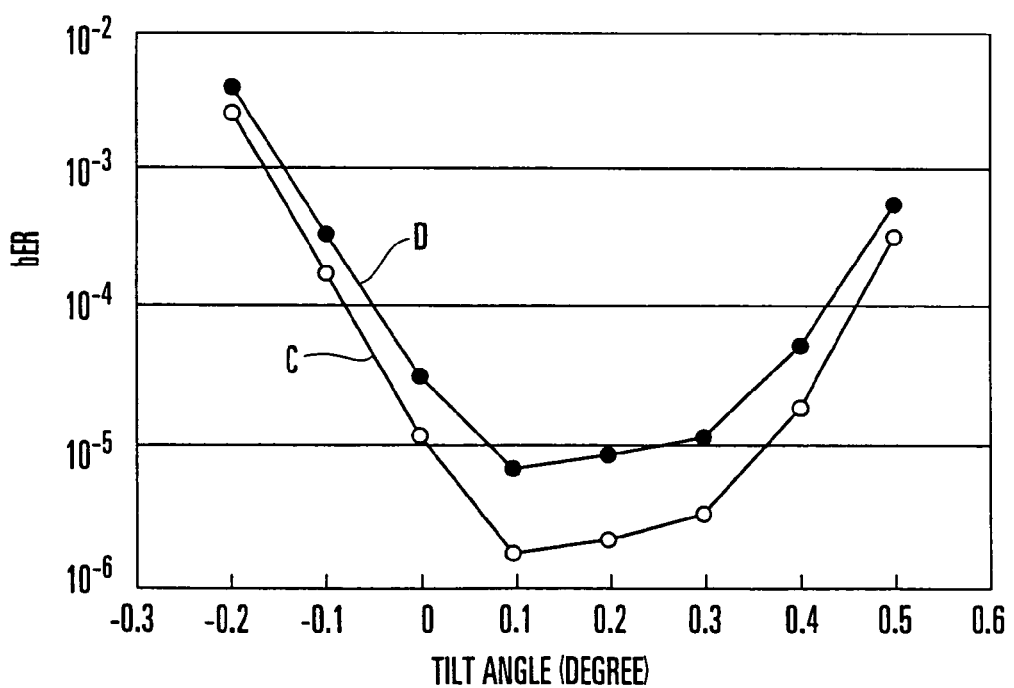
FIG. 11 is a graph showing bER/tilt angle characteristics in the use of a phase change optical disk.

As is obvious from FIG. 11, the bER (curve C) measured by the arrangement of the first embodiment is greatly improved at any tilt angle as compared with the bER (curve D) measured by the conventional arrangement.

Experiment 3

The effects of the above embodiments were checked by using a playback-only optical disk as the information recording medium 10.

Pit strings with a depth of about 100 nm were formed in the playback-only optical disk by recording random data modulated on the basis of the (1–7) modulation scheme at a linear density of 210 nm/bit. A playback signal was played back from these pit strings by using an optical head with a wavelength of 660 nm and numerical aperture NA=0.6 while the tilt angle of the disk was changed. As in Experiment 2, a bER was measured in the arrangement according to the first embodiment and in the conventional arrangement. In this experiment, however, PR (1, 2, 2, 1) was selected as a partial response waveform, the tap count of the FIR filter 14 was set to 7, and the tap coefficient of each of the FIR filters 16 and 17 was set to $r_m$=(1, 2, 2, 1).

As is obvious from FIG. 12, the bER (curve E) measured by the arrangement according to the first embodiment was greatly improved at any tilt angle as compared with the bER (curve F) measured by the conventional arrangement as in the case of the phase change optical disk in Experiment 2 shown in FIG. 11.

Experiment 4

A data string $h_j$ defining a partial response waveform was obtained by using the information playback apparatus according to the fourth embodiment shown in FIG. 9. With this operation, even if the tangent tilt of the disk greatly deviates from the normal state and the asymmetry of the playback waveform obtained from the disk increases, since the partial response waveform itself which is an equalization target is set to an asymmetrical waveform, the difference between the partial response waveform and the actual playback waveform can be reduced, and an increase in noise in partial response equalization can be suppressed.

More specifically, even if PR (l, 2, 2, 2, 1) is selected as the target partial response waveform $h_j$, when the tangent tilt is large, the waveform cannot be equalized to (1, 2, 2, 2, 1). For example, as in the case of $h_1=1.0$, $h_2=1.8$, $h_3=2$, $h_4=1.9$, and $h_5=1.1$, an symmetrical waveform represented by $h_1 \neq h_4$ and $h_2 \neq h_5$ appears. In this case, $A = \Sigma r_m^2$ ($\Sigma$ is the sum of m) described in the first embodiment takes the minimum value represented by A=10.9 with respect to error data string $e_L = (1, 0, -1, 0, 1)$, and the tap coefficient $r_m$ is defined by $r_m = (1, 1.8, 1, 0.1, -0.1, -0.1, -0.9, 1.9, 1.1)$.

In this manner, $r_m$ can be determined on the basis of a playback waveform from a disk as well as from a predetermined coefficient.

In order to calculate $h_j$ on the basis of a playback waveform from a disk, the pulse response calculator 22 of the information playback apparatus shown in FIG. 9 may use the least squares method disclosed in, for example, reference 3. In this case, $h_j$ can be calculated from the equalized waveform data string and the identification data output from the Viterbi detector 18 or the data string recorded on the disk.

In the circuit arrangement shown in FIG. 9, the first equalization is performed by the MMSE method as in the prior art with, for example, (1, 2, 2, 2, 1) being set a target. Then, $h_j$ is derived from the equalized waveform and the identification data or the data string recorded on the disk by the least squares method. After $h_j$ is derived, equalization is performed with $h_j$ being set as a target in consideration of the chromaticity of noise, which is a characteristic feature of the above embodiment, more specifically, through the FIR filter 21 having the tap coefficient $r_m$. Equalization is then performed by the FIR filter 14 with the tap coefficient $w_i$ calculated from the equalized waveform, thereby outputting final discrimination data by Viterbi detection.

When the tangent tilt was as large as 0.4°, bERs were compared under the following three conditions: (1) equalization was performed by the conventional method (MMSE), (2) equalization was performed by using (1, 2, 2, 2, 1) as $h_j$ in consideration of the chromaticity of noise, and (3) $h_j$ was derived from the actual playback waveform and equalization was performed in consideration of the chromaticity of noise. Table 1 shows the result.

TABLE 1

| (1) | (2) | (3) |
|---|---|---|
| $1.0 \times 10^{-3}$ | $5.0 \times 10^{-4}$ | $2.0 \times 10^{-4}$ |

As described above, in the above embodiments, when the playback data string $y_k$ obtained by playing back the recorded signal recorded on each of the information recording media 10 and 10*a* is to be equalized to the partial response waveform $h_j$ by the FIR filter 14, convolution computation is performed for the playback waveform data $y_k$ or the output data string from the FIR filter 14 and the data string obtained by convolution computation for the identification data string $a_k$ and the partial response waveform $h_j$, and the tap coefficient $w_i$ for the FIR filter 14 is determined on the basis of the obtained data string. With this operation, the tap coefficient $w_i$ for the FIR filter 14 is calculated on the basis of the autocorrelation of the noise component (equalization error) $v_d$ of the playback waveform data $y_k$ equalized to the partial response waveform $h_j$. As a consequence, the detection performance of the Viterbi detector 18 is optimized, and hence the bER is improved. In addition, the playback margins of the tilt, defocus, and the like of each of the information recording media 10 and 10*a* are increased.

What is claimed is:

1. An information playback apparatus comprising:
   a first FIR filter which generates an equalized waveform by equalizing, to a partial response waveform, a playback data string obtained by playing back a signal recorded on an information recording medium;
   target waveform generating means for generating a target waveform serving as an equalization target;
   weighted equalization error calculation means for calculating a data string by performing convolution computation for an equalization error which is a difference between the equalized waveform and the target waveform, on the basis of one of the playback data string and the equalized waveform input from said first FIR filter and the target waveform input from said target waveform generating means; and
   coefficient calculation means for calculating a tap coefficient for said first FIR filter on the basis of the data string input from said weighted equalization error calculation means, and outputting the tap coefficient to said first FIR filter.

2. An apparatus according to claim 1, wherein said weighted equalization error calculation means comprises:
   a second FIR filter which performs convolution computation for one of the playback data string and the equalized waveform;
   a third FIR filter which performs convolution computation for the target waveform; and
   subtraction means for calculating a data string by performing convolution computation for an equalization error on the basis of a difference between an output from said second FIR filter and an output from said third FIR filter.

3. An apparatus according to claim 1, wherein said weighted equalization error calculation means comprises:
   subtraction means for calculating an equalization error from a difference between the target waveform and one of the playback data string and the equalized waveform; and
   a fourth FIR filter which performs convolution computation for the equalization error input from said subtraction means.

4. An apparatus according to claim 1, wherein said target waveform generating means generates a target waveform by performing convolution computation for a partial response waveform and one of a data string of a recorded signal, an identification data string, and a data string estimated as recorded data.

5. An apparatus according to claim 4, further comprising a Viterbi detector which generates one of an identification data string and a data string estimated as recorded data on the basis of the equalized waveform input from said first FIR filter, and outputs the data string to said target waveform generating means.

6. An apparatus according to claim 1, wherein said coefficient calculation means calculates a tap coefficient on the basis of an autocorrelation of a data string obtained by performing convolution computation for an equalization error.

7. An apparatus according to claim 1, wherein said coefficient calculation means calculates a tap coefficient under a condition that a mean square of a data string input from said weighted equalization error calculation means is substantially minimized.

8. An apparatus according to claim 1, wherein letting $a_k$ (k is an integer of not less than one) be one of a data string of a recorded signal, an identification data string, and a data string estimated as recorded data, $y_k$ be a playback data string, $h_j$ (j is an integer satisfying $1 \leq j < k$) be a data string of a partial reference waveform, $w_i$ (i is an integer satisfying $1 \leq i < k$) be a data string of a tap coefficient for said first FIR filter, and $r_m$ (m is an integer satisfying $1 \leq m < k$) be an arbitrary data string, said coefficient calculation means calculates the data string $w_i$ of the tap coefficient which substantially minimizes $\epsilon$ defined by $$\varepsilon = E\left[\left(\sum_i w_i \times z_{k-i} - u_k\right)^2\right]$$

where E[ ] represents a mean of k in an expression in [ ], $$z_k = \sum_m r_m \times y_{k-m}$$

$$u_k = \sum_m r_m \times v_{k-m}$$

$$v_k = \sum_j a_{k-j} \times h_j.$$

9. An apparatus according to claim 8, wherein the data string $r_m$ is derived from the data string $h_j$.

10. An apparatus according to claim 4, further comprising partial response waveform calculation means for calculating a partial response waveform from an equalized waveform input from said first FIR filter and one of a data string of a recorded signal, an identification data string, and a data string estimated as recorded data, and outputs the partial response waveform to said target waveform generating means.

11. An information playback method comprising the steps of:
generating a playback data string by playing back a signal recorded on an information recording medium;
generating an equalized waveform by equalizing the playback data string to a partial response waveform using an FIR filter;
generating a target waveform serving as an equalization target;
calculating a data string by performing convolution computation for an equalization error which is a difference between the equalized waveform and the target waveform, on the basis of the target waveform and one of the playback data string and the equalized waveform; and
determining a tap coefficient for the first FIR filter on the basis of a data string obtained by performing convolution computation for the equalization error.

12. A method according to claim 11, wherein the step of calculating the data string comprises the steps of:
performing convolution computation for one of the playback data string and the equalized waveform;
performing convolution computation for the target waveform; and
calculating a data string by performing convolution computation for the equalization error on the basis of a difference between the two data strings obtained by the steps of performing the two convolution computations.

13. A method according to claim 11, wherein the step of calculating the data string comprises the steps of:
calculating an equalization error from a difference between the target waveform and one of the playback data string and the equalized waveform; and
performing convolution computation for the equalization error.

14. A method according to claim 11, wherein the step of generating the target waveform comprises the step of generating a target waveform by performing convolution computation for a partial response waveform and one of a data string of a recorded signal, an identification data string, and a data string estimated as recorded data.

15. A method according to claim 14, further comprising the step of generating one of the identification data string and the data string estimated as the recorded data on the basis of the equalized waveform.

16. A method according to claim 11, wherein the step of determining the tap coefficient comprises the step of determining a tap coefficient for the FIR filter under a condition that a mean square of a data string obtained by performing convolution computation for the equalization error is substantially minimized.

17. A method according to claim 11, wherein letting $a_k$ (k is an integer of not less than one) be one of a data string of a recorded signal, an identification data string, and a data string estimated as recorded data, $y_k$ be a playback data string, $h_j$ (j is an integer satisfying $1 \leq j < k$) be a data string of a partial reference waveform, $w_i$ (i is an integer satisfying $1 \leq i < k$) be a data string of a tap coefficient for the first FIR filter, and $r_m$ (m is an integer satisfying $1 \leq m < k$) be an arbitrary data string, the step of determining the tap coefficient comprises the step of determining the data string $w_i$ of the tap coefficient which substantially minimizes $\epsilon$ defined by $$\varepsilon = E\left[\left(\sum_i w_i \times z_{k-i} - u_k\right)^2\right]$$

where E[ ] represents a mean of k in an expression in [ ], $$z_k = \sum_m r_m \times y_{k-m}$$

$$u_k = \sum_m r_m \times v_{k-m}$$

$$v_k = \sum_j a_{k-j} \times h_j.$$

18. A method according to claim 17, wherein the data string $r_m$ is derived from the data string $h_j$.

19. A method according to claim 17, wherein
the data string $h_j$ comprises $h_1=1$, $h_2=2$, $h_3=2$, $h_4=1$, and $h_J=0$ (J is an integer of not less than five), and
the data string $r_m$ comprises $r_1=1$, $r_2=2$, $r_3=2$, $r_4=1$, and $r_M=0$ (M is an integer of not less than five).

20. A method according to claim 17, wherein
the data string $h_j$ comprises $h_1=1$, $h_2=2$, $h_3=2$, $h_4=2$, $h_5=1$, and $h_J=0$ (J is an integer of not less than six), and
the data string $r_m$ comprises $r_1=1$, $r_2=2$, $r_3=1$, $r_4=0$, $r_5=0$, $r_6=0$, $r_7=1$, $r_8=2$, $r_9=1$, and $r_M=0$ (M is an integer of not less than 10).

21. A method according to claim 11, further comprising the step of calculating a partial response waveform from a playback data string.

* * * * *